United States Patent
Zellner, Jr. et al.

(10) Patent No.: US 8,993,091 B2
(45) Date of Patent: Mar. 31, 2015

(54) FOAM-FILLED PANEL AND PROCESS FOR MANUFACTURE THEREOF

(75) Inventors: Kerry Scott Zellner, Jr., Saline, MI (US); Chase Nelson, Cincinnati, OH (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 179 days.

(21) Appl. No.: 13/431,274

(22) Filed: Mar. 27, 2012

(65) Prior Publication Data

US 2013/0260079 A1    Oct. 3, 2013

(51) Int. Cl.
| | |
|---|---|
| *B32B 3/30* | (2006.01) |
| *B32B 3/02* | (2006.01) |
| *B32B 5/20* | (2006.01) |
| *B32B 5/22* | (2006.01) |
| *B29C 44/24* | (2006.01) |
| *B29C 44/38* | (2006.01) |
| *B29L 9/00* | (2006.01) |
| *B29K 105/04* | (2006.01) |
| *B60K 37/00* | (2006.01) |
| *B60K 37/04* | (2006.01) |
| *B60R 21/04* | (2006.01) |
| *B60R 21/045* | (2006.01) |

(52) U.S. Cl.
USPC .......... 428/138; 428/71; 428/131; 428/137; 428/189; 428/192; 428/304.4; 296/70; 296/191; 180/90; 280/752; 264/46.5; 264/46.6

(58) Field of Classification Search
CPC .............. B29L 2031/3008; B29L 2031/3014
See application file for complete search history.

(56) References Cited

U.S. PATENT DOCUMENTS

| | | | | |
|---|---|---|---|---|
| 4,373,745 | A | * | 2/1983 | Matsuno ................ 280/752 |
| 4,456,640 | A | * | 6/1984 | Nishihara ................ 428/31 |
| 4,968,465 | A | * | 11/1990 | Rhodes, Jr. ............. 264/46.5 |
| 5,358,300 | A | | 10/1994 | Gray |
| 6,076,246 | A | * | 6/2000 | McCooey ............... 29/469.5 |
| 6,237,935 | B1 | | 5/2001 | Gray et al. |
| 6,352,658 | B1 | * | 3/2002 | Chang et al. ........... 264/46.4 |
| 7,147,809 | B2 | | 12/2006 | Cowelchuk et al. |

(Continued)

FOREIGN PATENT DOCUMENTS

| | | | | |
|---|---|---|---|---|
| DE | 19814956 | A | * 10/1999 | |
| FR | 2634157 | A1 | * 1/1990 | ......... B29C 39/10 |

(Continued)

OTHER PUBLICATIONS

Machine Translation of DE 19814956 A, Oct. 1999.*

*Primary Examiner* — Jeff Vonch
(74) *Attorney, Agent, or Firm* — Gifford, Krass, Sprinkle, Anderson & Citkowski, P.C.

(57) ABSTRACT

A foam-filled panel is provided. The foam-filled panel can have a substrate layer with a padded area, an unpadded area, an opening within said unpadded area, and a bounding region between the padded area and the unpadded area. A skin can extend across the padded area of the substrate layer and a foam layer can be present between the padded area of the substrate layer and the skin. In addition, a disposable foam injection port is attached to the substrate layer at the bounding region of the padded area and can extend into and be an obstruction to the opening. The disposable foam injection port can be in fluid communication with the foam layer and unattaching the disposable foam injection port from the substrate layer can remove the obstruction to the opening.

8 Claims, 3 Drawing Sheets

(56) References Cited

U.S. PATENT DOCUMENTS

| | | | |
|---|---|---|---|
| 7,819,456 B2 * | 10/2010 | Robertson | 296/70 |
| 2001/0030444 A1 * | 10/2001 | Whitehead et al. | 296/146.7 |
| 2006/0220414 A1 * | 10/2006 | Boyer | 296/146.7 |

FOREIGN PATENT DOCUMENTS

| | | | | | |
|---|---|---|---|---|---|
| FR | 2947220 A1 | * | 12/2010 | | B29C 44/12 |
| FR | 2947221 A1 | * | 12/2010 | | B29C 44/12 |
| JP | 56118830 A | * | 9/1981 | | B29D 27/04 |
| JP | 60166420 A | * | 8/1985 | | B29C 39/10 |
| JP | 61116509 A | * | 6/1986 | | B29C 39/10 |
| JP | 61165509 A | * | 7/1986 | | F23D 1/00 |
| JP | 01120312 A | * | 5/1989 | | B29C 39/10 |
| JP | 04018315 A | * | 1/1992 | | B29C 39/10 |
| JP | 05016165 A | * | 1/1993 | | B29C 43/18 |
| JP | 09117920 A | * | 5/1997 | | B29C 39/10 |
| JP | 2000062642 A | * | 2/2000 | | B62D 21/00 |
| JP | 2000108143 A | * | 4/2000 | | B29C 39/10 |
| JP | 2001300948 A | * | 10/2001 | | B29C 39/24 |
| JP | 2001310338 A | * | 11/2001 | | B29C 39/10 |
| JP | 2002103374 A | * | 4/2002 | | B29C 45/14 |
| JP | 2002172651 A | * | 6/2002 | | B29C 45/16 |
| JP | 2002225046 A | * | 8/2002 | | B29C 39/10 |
| JP | 2003340840 A | * | 12/2003 | | B29C 39/02 |
| JP | 2005186798 A | * | 7/2005 | | B60K 37/00 |
| JP | 2007160579 A | * | 6/2007 | | |
| JP | 2011245946 A | * | 12/2011 | | |
| JP | 2012228788 A | * | 11/2012 | | |
| JP | 2013000929 A | * | 1/2013 | | |
| WO | WO 9939931 A1 | * | 8/1999 | | B60J 5/04 |

* cited by examiner

FOAM-FILLED PANEL AND PROCESS FOR MANUFACTURE THEREOF

FIELD OF THE INVENTION

The present invention is related to a foam-filled panel, and in particular, to a foam-filled panel having a disposable foam injection port.

BACKGROUND OF THE INVENTION

Panels that have a layer of foam between an outer skin and an inner substrate are known. Such panels typically have the layer of foam extending across at least a part of the substrate layer and the outer skin extending across the foam layer such that a three-layered panel is provided. For example, instrument panels for motor vehicles can include such a panel with the underlying substrate typically made from a polymeric material and the outer skin made from a flexible sheet material such as leather, flexible polymeric materials, and the like. In between the substrate and the skin the foam layer provides a cushioned appearance and/or feel which can provide the look and feel of a luxury vehicle and the like.

Prior art foam-filled panels as shown in FIGS. 1 and 2 at reference numeral 10 have typically required multiple manufacturing steps after the panel 10 has been produced in order to complete or make the panel 10 suitable for installation into a separate component such as a motor vehicle, speaker system, and the like. For example, the foam-filled panel 10 can be part of an instrument panel for a motor vehicle and have an underlying substrate 100, an intermediate foam layer 110, and an outer skin 120. Production of the panel 10 typically includes placing the substrate 100 and the outer skin 120 in a clamshell foam-filling apparatus such that upon closure of the clamshell apparatus edges of the outer skin 120 are sealed against appropriate regions of the substrate 100. The a liquid foam mixture is injected through a foam injection port 102 in order to fill a foam space between the substrate 100 and the outer skin 120.

In order to prevent leaking of the liquid foam mixture during the filling process, apertures such as those shown at 104 must be covered with tape 106 and the outer skin 120 must extend and be continuous over the port 102. Then after the foam mixture has been provided between the substrate 100 and the outer skin 120, and allowed to harden or cure in order to provide the foam layer 110, additional steps are required. For example, it is not uncommon for the foam injection port 102 to be located at a position where an acoustic speaker for the motor vehicle is to be located. However, a complete or full speaker opening would be too large to serve as a foam injection port, and as such, the foam injection port 102 must be expanded by removal of material 108 from the substrate 100 after the foam layer 110 has been provided and in order to afford a useable speaker opening.

In addition to the above, a portion 122 of the outer skin 120 must also be removed in order for the speaker to be attached to the substrate 100 using apertures 104. As such, at least two additional steps that include removal of the outer skin portion 122 and removal of the substrate portion 108 are required after the three-layered foam injected panel 10 has been produced. Furthermore, applying and then removal of the tape 106 to cover and then uncover, respectively, the apertures 104 is at least two more steps that require added expense labor, etc. during the manufacture of the foam-filled panel 10.

Therefore, a foam-filled panel that did not require additional materials, additional steps during manufacture, and the like would be desirable.

SUMMARY OF THE INVENTION

A foam-filled panel is provided. The foam-filled panel can have a substrate layer with a padded area, an unpadded area, an opening within said unpadded area, and a bounding region between the padded area and the unpadded area. A skin can extend across the padded area of the substrate layer and a foam layer can be present between the padded area of the substrate layer and the skin. In addition, a disposable foam injection port can be attached to the substrate layer at the bounding region and can extend into and be an obstruction to the opening. The disposable foam injection port can be in fluid communication with the foam layer and unattaching the disposable foam injection port from the substrate layer can remove the obstruction to the opening.

In some instances, the opening is a speaker opening dimensioned for an acoustic speaker to be attached thereto after the disposable foam injection port is unattached from the substrate layer. In addition, the skin can have an edge region that is sealed against the bounding region and the foam layer can be an injected foam layer formed by flowing a multi-component foam mixture through the disposable foam injection port and in between the substrate layer padded area and the skin.

The foam-filled panel can also include a foam injection opening between the substrate layer and the edge region of the skin. In some instances, the foam injection port can be in fluid communication with the foam injection opening and thereby afford the multi-component foam mixture to flow from the foam injection port and into a foam space between the padded area of the substrate layer and the skin extending across the padded area.

The disposable foam injection port can be a generally U-shaped injection port that extends from the bounding region into the opening. The disposable foam injection port can also have a flow channel that is generally parallel to the padded area of the substrate layer.

A multi-component foam mixture pumping unit can also be included and be in fluid communication with the disposable foam injection port. The pumping unit is operable to mix two or more foam components to form the multi-component foam mixture and pump the foam mixture through the disposable foam injection port, through the foam injection opening, and in between the padded area of the substrate layer and the skin extending across the padded area. It is appreciated that pumping of the multi-component foam mixture in between the padded area and the skin affords for the foam layer.

A process for manufacturing a three-layered foam injected panel is also disclosed. The process can include providing a substrate layer having a padded area, an unpadded area, an opening within the unpadded area, and a bounding region that encompasses or surrounds the padded area. A skin is also provided and extended across the padded area of the substrate layer, the padded area and the skin providing a foam space layer therebetween.

A disposable foam injection port is provided and is attached to the substrate layer at or proximate to the bounding region of the padded area and is in fluid communication with the foam space layer. The attached disposable foam injection port extends into and is an obstruction to an opening within the unpadded area of the substrate layer. The process also includes flowing a multi-component foam mixture through the disposable foam injection port and into the foam space layer to form a foam layer between the padded area of the substrate layer and the skin extending across the padded area. Thereafter, the disposable foam injection port is unattached from the substrate layer, thereby removing the obstruction to the opening within the unpadded area.

An edge portion of the skin can be sealed to the bounding region of the padded area before flowing the multi-component foam mixture through the disposable foam injection port and into the foam space layer. In addition, a foam injection opening can be present between the attached disposable foam injection port and the foam space layer, and the multi-component foam mixture can flow generally parallel to the substrate layer as it flows out of the attached disposable foam injection port, through the foam injection opening and/or into the foam space layer.

BRIEF DESCRIPTION OF THE DRAWINGS

FIG. 5 is a top plan view of the foam-filled panel shown in FIG. 3.

DETAILED DESCRIPTION OF THE PRESENT INVENTION

The present invention provides a foam-filled panel. As such, the present invention has utility as a component for a motor vehicle.

The foam-filled panel can be in the form of an instrument panel for a motor vehicle, however this is not required. The foam-filled panel can also provide an instrument panel with an opening, e.g. a speaker opening, and the panel can have a padded area where foam is located between an underlying substrate layer and an overlying skin. It is appreciated that the substrate layer, the skin, and the foam can be made from any material known to those skilled in the art, illustratively including plastics, leather, elastomeric materials, polymer sheet materials, metals, alloys, ceramics, wood, cloth materials, fiber materials, etc.

A disposable foam injection port is attached to the substrate layer at and/or proximate to a bounding region that bounds or limits the padded area, the disposable foam injection port also extending into and being an obstruction to an opening within an unpadded area of the substrate layer that does not have the skin and/or foam layer extending thereacross. The disposable foam injection port may or may not be U-shaped and may or may not have a flow channel that affords for a liquid foam mixture to flow into a foam space that is present between the padded area of the substrate layer and the outer skin.

The disposable foam injection port can be removed or unattached from the substrate layer and thereby remove any obstruction to the opening such that a separate component, e.g. a speaker, can be attached and/or located within the opening. It is appreciated that the disposable foam injection port can be removed or unattached from the substrate layer in a single manufacturing step and can also result in minimal displacement or removal of the overlying skin and/or the underlying substrate layer for the padded area.

Figure 1:
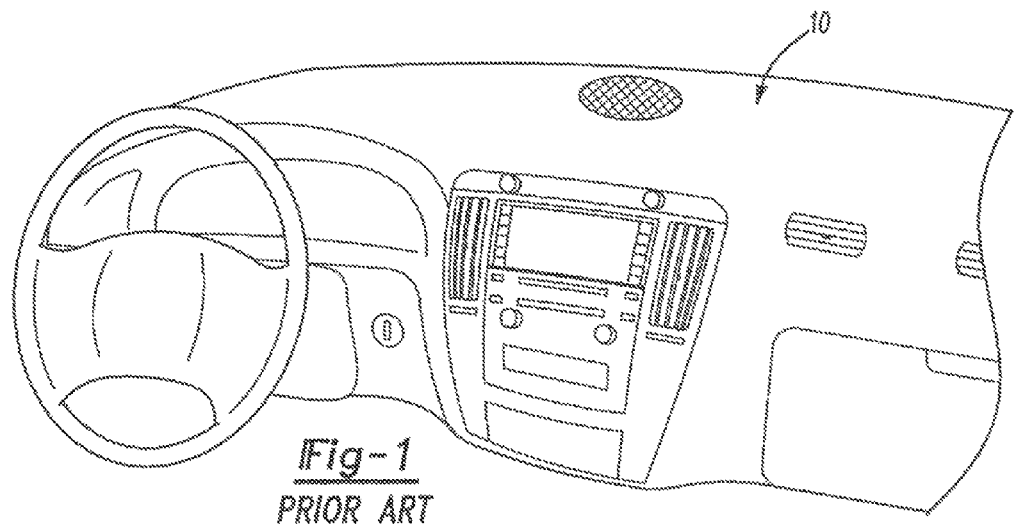
FIG. 1 is a perspective view of a prior art foam-filled panel in the form of an instrument panel for a motor vehicle.
Figure 2:
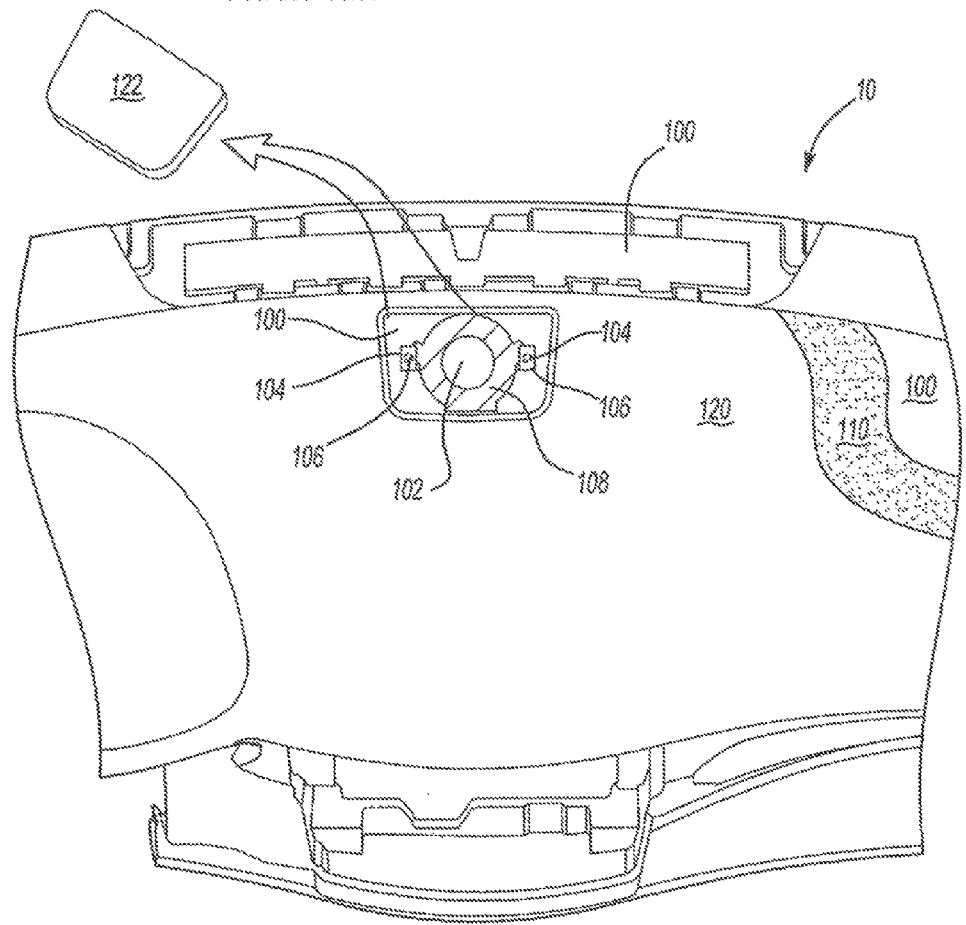
FIG. 2 is a top plan view of the foam-filled panel shown in FIG. 1 illustrating the various layers and steps required to form the panel 10.
Figure 3:
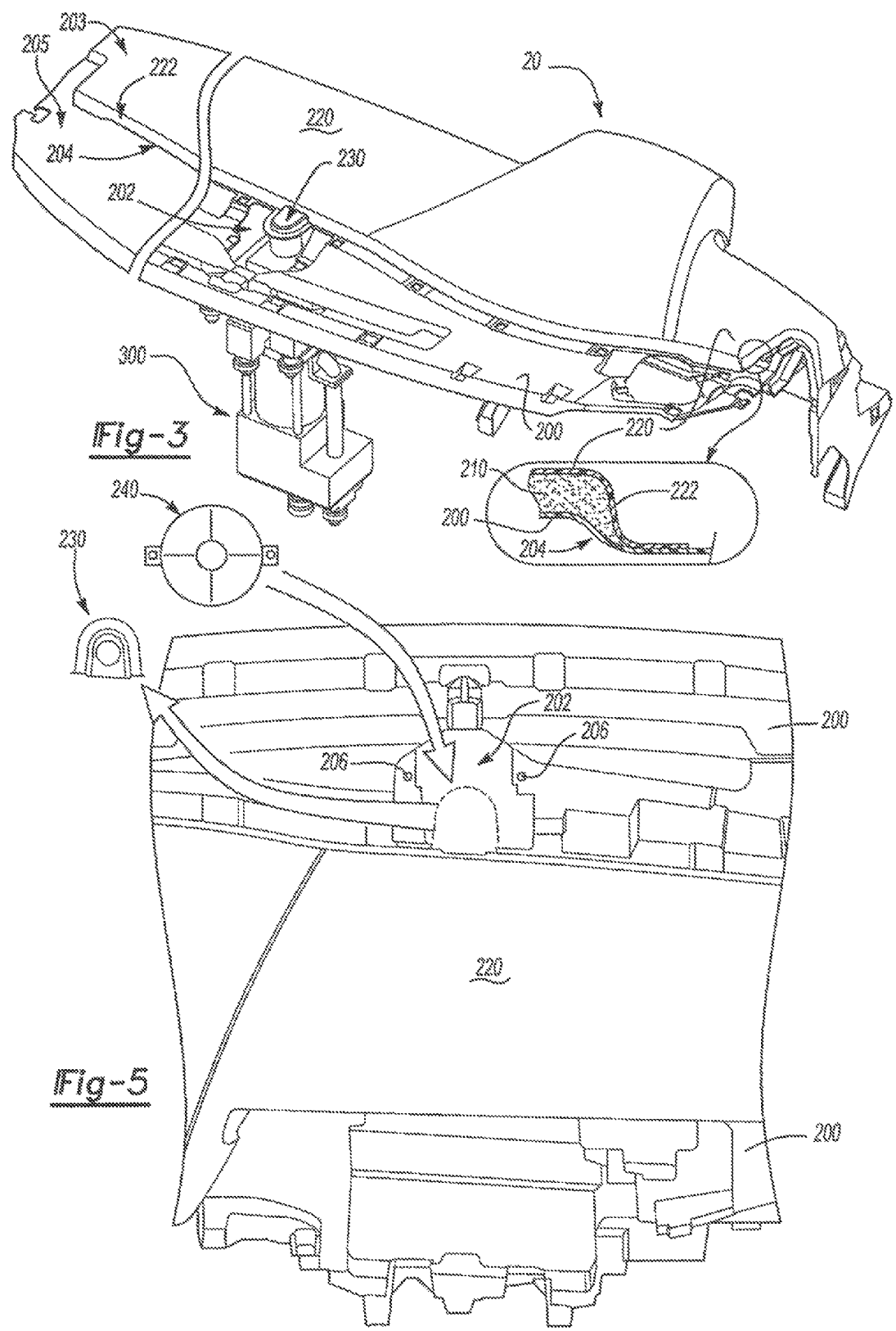
FIG. 3 is a top perspective view of a foam-filled panel according to an embodiment of the present invention.
Figure 4:
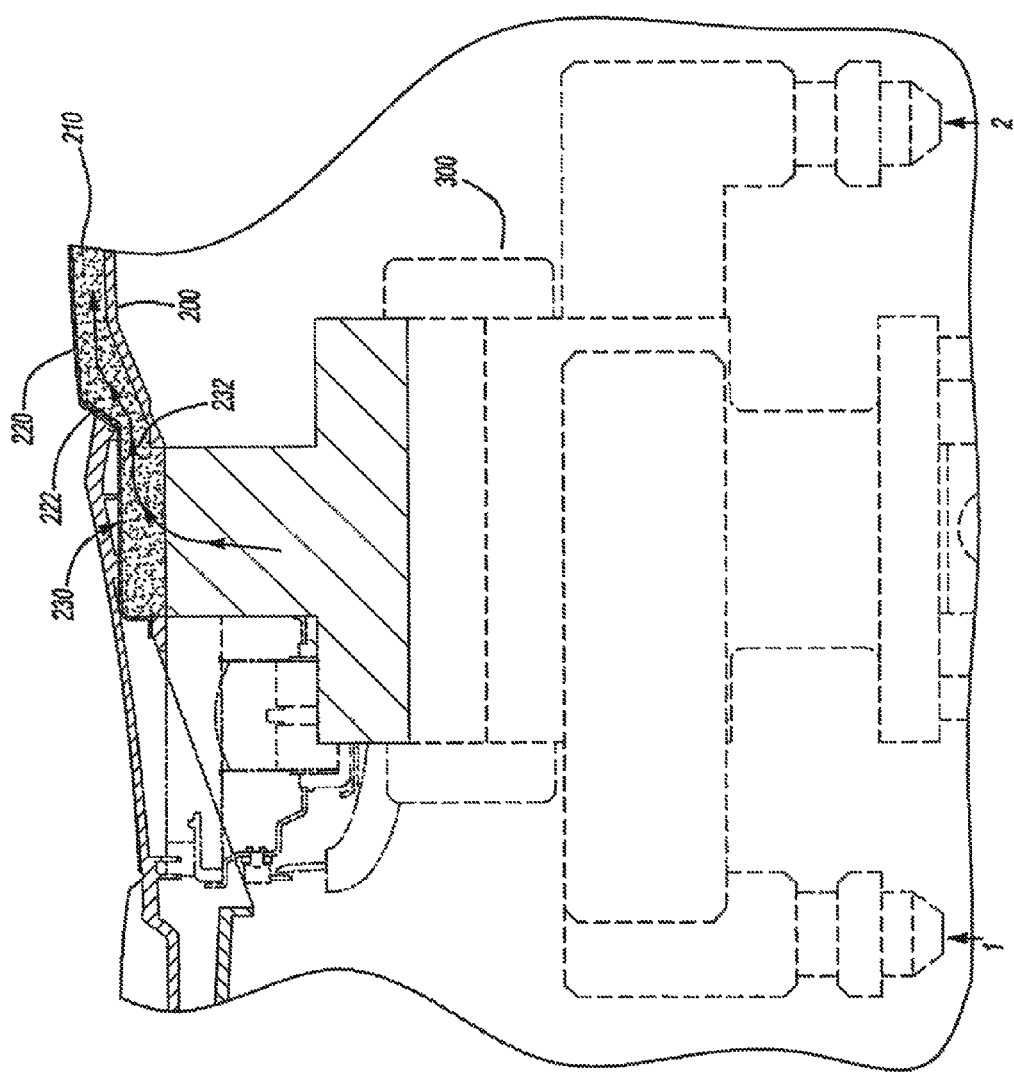
FIG. 4 is a side cross-sectional view of a portion of the foam-filled panel shown in FIG. 3.

Turning now to FIGS. 3-5, an embodiment of the foam-filled panel is shown generally at reference numeral 20. As shown in FIG. 3, the panel 20 can be in the form of an instrument panel for a motor vehicle. The panel 20 can have a substrate layer 200 and a skin 220 extending over at least a portion of the substrate layer 200. Between a portion of the substrate layer 200 and the skin 220 can be a foam layer 210. It is appreciated that the area of the substrate layer 200 that does have the foam layer 210 and/or the skin 220 extending thereacross can be considered a padded area 203 and a portion of the substrate layer 200 that does not have a foam layer and/or a skin extending thereacross can be considered an unpadded area 205.

Between the padded area 203 and the unpadded area 205 can be a bounding region 204 that encompasses and/or surrounds the padded area 203. As such, the bounding region 204 can be a transition area of the substrate layer 200 that is generally located between the padded area 203 and the unpadded area 205. In addition, an opening 202 can be within the unpadded area 205, the opening 202 allowing a separate component to be attached therein if not obstructed.

In some instances, the skin 220 can have an edge region 222 that is sealed against the bounding region 204 such that a foam mixture does not leak therebetween when the foam-filled panel 20 is being manufactured. As shown in the figure, the foam layer 210 is located between the substrate layer 200 and the skin 220 such that a cushioned panel is provided. In addition, it is appreciated that the foam layer 210 between the substrate layer 200 and the skin 220 is present or extends along the padded area 203 of the substrate layer 200.

During manufacture of the foam-filled panel 20, a multi-component foam mixture pumping unit 300 (see FIG. 4) can be used to pump a liquid foam mixture through a disposable foam injection port 230 that is attached to the substrate layer 200 and thereby afford for the foam mixture to flow between the substrate layer 200 and the skin 220. It is appreciated that the flowing or liquid foam mixture can be allowed to harden or cure in order to provide the foam layer 210.

The disposable foam injection port 230 can be a generally U-shaped foam injection port that is attached to the bounding region 204 of the substrate layer 200 and may or may not have an edge region 222 of the skin 220 sealed against it as shown in FIG. 4. In addition, the pumping unit 300 can have a first foam component 1 and a second foam component 2 supplied thereto, and upon mixing, a liquid foam mixture is forced to flow through the foam injection port 230 and in between the substrate layer 200 and the skin 220. It is appreciated that the foam injection port 230 can provide a flow channel 232 that affords for the flow mixture to flow generally parallel to the substrate layer 200 as it exits the port 230. In this manner, improved fluid flow can be provided by the embodiment 20 when compared to heretofore known foam-filled panels, processes for making foam-filled panels, and the like.

Looking now at FIG. 5, after the three-layered structure having a substrate 200, a foam layer 210, and a skin 220 has been produced, the disposable foam injection port 230 can be unattached from the substrate layer 200 and/or the bounding region 204. In addition, removal or unattachment of the port 230 can be the result of a single manufacturing or unattachment step cutting the port 230 off of the panel 20 with a sharp blade, sawing the port 230 off of the panel 20 with a saw, and the like. In addition, the disposable foam injection port 230 can have a frangible line or portion that provides a seal when the liquid foam mixture is flowing therethrough but also allows the port 230 to be removed by hand with an up-and-down motion applied to the port 230 as known to those skilled in the art.

After the disposable foam injection port 230 has been unattached from the substrate layer 200, obstruction to the opening 202 is removed and a separate component 240 can be placed at least partially within the opening 202. For example and for illustrative purposes only, the opening 202 can have one or more apertures 206 proximate thereto and the component 240 can be an acoustic speaker that can be attached within the opening 202 and to the substrate layer 200 using one or more threaded fasteners as is known to those skilled in the art. In this manner, an improved foam-filled panel and a process for manufacturing such a panel are provided.

The above embodiment and teachings are for illustrative purposes only and are not meant to limit the scope of the invention. As such, modifications, changes, and the like will occur to those skilled in the art given the teachings herein and thus can fall within the scope of the invention. As such, it is the claims and all equivalents thereof that define the invention and its scope.

We claim:

1. A foam-filled panel comprising:
    a substrate layer having a padded area, an unpadded area, an opening within said unpadded area and a bounding region between said padded area and said unpadded area;
    a skin extending across said padded area of said substrate layer;
    a foam layer between said padded area of said substrate layer and said skin; and
    a disposable generally U-shaped foam injection port extending from said padded area bounding region into said opening, said disposable foam injection port having a flow channel that is generally parallel to said substrate layer padded area, said disposable foam injection port attached to said substrate layer at said bounding region of said padded area and extending into and being an obstruction to said opening, said disposable foam injection port also in fluid communication with said foam layer and being unattachable from said substrate layer and thereby removing said obstruction to said opening.

2. The foam-filled panel of claim 1, wherein said opening is a speaker opening.

3. The foam-filled panel of claim 2, wherein said skin has an edge region sealed against said padded area bounding region.

4. The foam-filled panel of claim 3, wherein said foam layer is an injected foam layer formed by flowing a multi-component foam mixture through said disposable foam injection port and in between said substrate layer padded area and said skin.

5. A three-layered foam injected instrument panel for a motor vehicle comprising:
    an instrument panel substrate layer having a padded area, an unpadded area and an acoustic speaker opening within said unpadded area, said padded area having a bounding region adjacent to said unpadded area;
    a skin extending across said padded area;
    a foam layer between said padded area and said skin layer;
    a disposable generally U-shaped foam injection port extending from said padded area bounding region into said opening, said disposable foam injection port having a flow channel that is generally parallel to said substrate layer padded area, said disposable foam injection port attached to said substrate layer at said bounding region of said padded area and extending into and being an obstruction to said speaker opening, said disposable foam injection port also in fluid communication with said foam layer and being unattachable from said substrate layer and thereby removing said obstruction to said speaker opening.

6. The three-layered foam injected instrument panel of claim 5, wherein said skin has an edge region sealed against said padded area bounding region.

7. The three-layered foam injected instrument panel of claim 6, wherein said foam layer is an injected foam layer formed by flowing a multi-component foam mixture through said disposable foam injection port and in between said padded area of said substrate layer and said skin.

8. The three-layered foam injected instrument panel of claim 5, further comprising a multi-component foam mixture pumping unit in fluid communication with said disposable foam injection port, said pumping unit operable to mix two or more foam components to form said multi-component foam mixture and pump said foam mixture through said disposable foam injection port and in between said padded area and said skin extending across said padded area.

\* \* \* \* \*